United States Patent
Yamamoto

(10) Patent No.: US 6,932,736 B2
(45) Date of Patent: Aug. 23, 2005

(54) TOROIDAL CONTINUOUSLY VARIABLE TRANSMISSION

(75) Inventor: Takeshi Yamamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 79 days.

(21) Appl. No.: 10/290,249

(22) Filed: Nov. 8, 2002

(65) Prior Publication Data

US 2003/0104897 A1 Jun. 5, 2003

(30) Foreign Application Priority Data

Dec. 3, 2001 (JP) ...................................... 2001-368415

(51) Int. Cl.$^7$ .............................................. F16H 15/38
(52) U.S. Cl. .......................... 476/46; 476/40; 384/571
(58) Field of Search ...................... 476/40–46; 384/618, 384/619, 622, 571

(56) References Cited

U.S. PATENT DOCUMENTS

| | | | | |
|---|---|---|---|---|
| 1,649,285 A | * | 11/1927 | Buckwalter ................. | 384/618 |
| 5,679,090 A | * | 10/1997 | Imanishi ...................... | 476/42 |
| 5,989,150 A | * | 11/1999 | Yamamoto .................... | 476/8 |
| 6,086,261 A | * | 7/2000 | Nakagawa et al. ......... | 384/571 |
| 6,282,789 B1 | * | 9/2001 | Kino et al. ................ | 29/895.3 |

FOREIGN PATENT DOCUMENTS

| JP | 58-112762 U | 8/1983 |
|---|---|---|
| JP | 2-47458 U | 3/1990 |
| JP | 2001-4003 A | 1/2001 |
| JP | 2001-41230 A | 2/2001 |

\* cited by examiner

Primary Examiner—William C. Joyce
(74) Attorney, Agent, or Firm—Foley & Lardner LLP

(57) ABSTRACT

In a toroidal continuously variable transmission having a plurality of power rollers interposed between input and output disks under axial preload and using a tapered roller bearing as a power roller bearing, a radial load and a thrust load acting on an inner race are received or supported by way of the tapered roller bearing. An inner raceway surface formed on the inner race is located to be offset from a line of action common to a radial component of a contact pressure acting on a contact point between the inner race and the input disk and a radial component of a contact pressure acting on a contact point between the inner race and the output disk toward an outer race.

12 Claims, 8 Drawing Sheets

RADIAL BEARING  SHAFT PORTION

DEFORMED INNER RACE

Fr  Fr

Fr  Fr

TOROIDAL CONTINUOUSLY VARIABLE TRANSMISSION

TECHNICAL FIELD

The present invention relates to a toroidal continuously variable transmission for a vehicle, and specifically to the improvements of a power roller bearing for use in a toroidal continuously variable transmission.

BACKGROUND ART

In recent years, to meet demands for increased shift comfort, improved driveability, and reduced fuel consumption and exhaust emissions, there have been proposed and developed toroidal continuously variable transmissions often abbreviated to "toroidal CVTs", in which a transmission ratio is steplessly variable within limits. Japanese Utility-Model Provisional Publication No. 58-112762 (hereinafter is referred to as "JU58-112762") discloses a toroidal CVT using a tapered roller bearing as a power roller bearing. In the conventional toroidal CVT disclosed in JU58-112762, an inner raceway surface extends almost all over the surface of an inside-diameter portion of an inner race of a power roller. Additionally, a contact angle of the inner raceway surface is set to be 45° or less.

SUMMARY OF THE INVENTION

Referring now to FIGS. 10 through 14, there are shown vector analysis of various loads applied to a power-roller inner race, examples of a power roller bearing structure, and deformations of power-roller inner races respectively having a hollow cross section and a partially solid cross section owing to application of a radial component of a contact pressure created by axial preload (thrust or loading force), which is produced by means of a so-called loading cam device and whose magnitude is substantially proportional to input torque transmitted to the loading cam device. As is generally known, on such toroidal CVTs, engine power (torque) is transmitted from an input disk to an output disk via a traction oil film formed between a power roller and each of the input and output disks, using a shearing force in the traction oil film at high contact pressure. Thus, as shown in FIG. 10, a shearing force Ftr and a contact pressure Fc, under which the shearing force in the traction oil film is created, are both applied via each of input and output disks to a power-roller inner race. As can be seen from the cross section shown in FIG. 11, of these forces (Ftr, Ftr) and pressures (Fc, Fc), a radial component Fr of the first contact pressure Fc applied via the input disk and a radial component Fr of the second contact pressure Fc applied via the output disk are cancelled to each other, since radial component Fr of the first contact pressure Fc has the opposite sense with respect to radial component Fr of the second contact pressure Fc. The sum Ft of an axial component Ft/2 of the first contact pressure Fc and an axial component Ft/2 of the second contact pressure Fc is supported by a tapered roller bearing that serves as a power roller bearing. As shown in FIG. 11, assuming that a semi vertical angle is denoted by θ, the previously-noted sum Ft of the two axial components Ft/2, Ft/2 having the same magnitude and the same sense, is represented by the following expression (1).

$$Ft=2Fc \cdot \cos \theta \quad (1)$$

Assuming that a contact angle of the inner raceway surface is denoted by a and the number of rolling elements of the tapered roller bearing is denoted by Z, an applied load ftc per rolling element, occurring owing to contact pressure Fc, is represented by the following expression (2).

$$ftc=Ft/Z/\sin \alpha \quad (2)$$

As appreciated from the expression (2), it is possible to greatly reduce the applied load ftc per rolling element by setting contact angle α as close to 90° as possible. In other words, setting contact angle α as close to 90° as possible contributes to a reduction in torque loss that may occur at the tapered roller bearing. From the viewpoint of only the torque-loss reduction effect, it is desirable to set contact angle α as close to 90° as possible.

However, shearing force Ftr as well as contact pressure Fc acts on the power-roller inner race. Owing to shearing force Ftr, an additional radial load component is applied to the tapered roller bearing. The share of the additional radial load component among the rolling elements of the tapered roller bearing is not uniform but very complicated. For the purpose of simplification of the disclosure, assuming that a rate of the share of the additional radial load component allocated to a certain rolling element is denoted by ε, a load frc applied to the certain rolling element, occurring owing to shearing force Ftr, is represented by the following expression (3).

$$frc=\epsilon \cdot Ftr/Z/\cos \alpha \quad (3)$$

As appreciated from the expression (3), the load frc applied to the certain rolling element tends to greatly increase by setting contact angle α as close to 90° as possible. That is, setting contact angle α as close to 90° as possible leads to the problem of an increased elastic deformation at a contact portion between the rolling element and the inner raceway surface. In such a case, a radial displacement of the inner race to the outer race tends to remarkably increase. In other words, from the viewpoint of only the enhanced radial rigidity of the tapered roller bearing, it is undesirable to set contact angle a as close to 90° as possible. However, actually, the magnitude of shearing force Ftr is excessively smaller than that of axial load component Ft (Ftr<<Ft), and the magnitude of applied load frc is excessively smaller than that of applied load ftc (frc<<ftc). The torque loss that may occur at the tapered roller bearing due to the applied load frc is negligible. In order to balance the previously-discussed two contradictory requirements, that is, reduced torque loss and enhanced radial rigidity of the tapered roller bearing, as shown in FIG. 12, it is advantageous to install a radial bearing used to provide lateral support to a power-roller shaft portion and to support shearing force Ftr, separately from the tapered roller bearing, while setting contact angle α as close to 90° as possible. However, the additional radial bearing leads to the problem of increased total manufacturing costs of toroidal CVTs. As discussed above, radial component Fr of the first contact pressure Fc applied via the input disk and radial component Fr of the second contact pressure Fc applied via the output disk are cancelled to each other, since these two radial components (Fr, Fr) have the same magnitude and the same line of action but different sense. Therefore, as shown in FIG. 13, such a pair of radial components Fr, Fr causes the power-roller inner race to deform, and whereby rolling elements of the tapered roller bearing tend to be strongly sandwiched between the inner raceway surface and the outer raceway surface. It is impossible to cancel these two radial components Fr, Fr to each other by way of only the deformation of the power-roller inner race, because a part of radial component Fr is supported by means of the rolling elements of the tapered roller bearing and the outer race. In particular in case of the hollow-cross-section power-roller inner race structure (see FIG. 13) having a comparatively large inverted frusto-conical hollow, the degree of elastic deformation of the inner race is comparatively large. The conventional toroidal CVT disclosed in JU58-112762 uses the hollow-cross-section power-roller inner race structure. In this case, owing to the comparatively large inner-race deformation there is an increased tendency for an excessively large load to be transferred or applied to the tapered roller bearing. This shortens a fatigue life of the power roller bearing. Although the conventional toroidal CVT disclosed in JU58-112762 uses the hollow-cross-section power-roller inner race structure, in lieu thereof it is possible to form the power-roller inner-race inner peripheral portion facing toward a common rotation axis of the input and output disks as a partially solid cross section structure or as a comparatively higher radial rigidity portion than the power-roller inner-race outer peripheral portion facing apart from the common rotation axis. However, in the conventional toroidal CVT disclosed in JU58-112762, the inner raceway surface actually lies on the line of action of each of radial component Fr of the first contact pressure Fc applied via the input disk and radial component Fr of the second contact pressure Fc applied via the output disk. In case of the conventional toroidal CVT disclosed in JU58-112762, actually, the inner-race portion lying on the line of action of each radial component Fr is a hollow cross section structure. Therefore, as shown in FIG. 14, the deformation of the power-roller inner-race inner peripheral portion having a relatively higher radial rigidity is little, but the deformation of the power-roller inner-race outer peripheral portion having a relatively lower radial rigidity is great. As a result of deformation of the power-roller inner-race outer peripheral portion during operation of the toroidal CVT, there is an increased tendency for an excessively large load to be applied to the tapered roller bearing, thus shortening a fatigue life of the power roller bearing.

Accordingly, it is an object of the invention to provide a toroidal continuously variable transmission, which avoids the aforementioned disadvantages.

In order to accomplish the aforementioned and other objects of the present invention, a toroidal continuously variable transmission comprises input and output disks coaxially arranged with each other and having respective toroidal grooves opposed to each other, a plurality of power rollers interposed between the toroidal grooves of the input and output disks under axial preload for power transmission, a plurality of trunnions rotatably supporting the respective power rollers to permit tilting motions of the power rollers about trunnion axes for ratio changing, each of the power rollers comprising an inner race that transmits power input to the input disk into the output disk via a traction oil film formed between each of the power rollers and each of the input and output disks, using a shearing force in the traction oil film, an outer race that is supported by the trunnion associated therewith, and a power roller bearing that rotatably supports the inner race to permit relative rotation of the inner race to the outer race, the power roller bearing comprising a tapered roller bearing, the tapered roller bearing including an inner raceway surface formed on the inner race, an outer raceway surface formed on the outer race, a plurality of rolling elements, each sandwiched between the inner and outer raceway surfaces and having a frusto-conical shape in axial cross section, and a collared portion that guides the rolling elements, the tapered roller bearing receiving both a radial load and a thrust load acting on the inner race, and the inner raceway surface located to be offset from a contact point between the inner race and the input disk and a contact point between the inner race and the output disk toward the outer race.

According to another aspect of the invention, a dual cavity type toroidal continuously variable transmission with a torque transmission shaft and a pair of variator units set in tandem and coaxially arranged in reverse to each other on the torque transmission shaft, each variator unit comprising input and output disks coaxially arranged with each other and having respective toroidal grooves opposed to each other, a pair of power rollers interposed between the toroidal grooves of the input and output disks under axial preload for power transmission, a pair of trunnions rotatably supporting the respective power rollers to permit tilting motions of the power rollers about trunnion axes for ratio changing, each of the power rollers comprising an inner race that transmits power input to the input disk into the output disk via a traction oil film formed between each of the power rollers and each of the input and output disks, using a shearing force in the traction oil film, an outer race that is supported by the trunnion associated therewith, and a power roller bearing that rotatably supports the inner race to permit relative rotation of the inner race to the outer race, the power roller bearing comprising a tapered roller bearing, the tapered roller bearing including an inner raceway surface formed on the inner race, an outer raceway surface formed on the outer race, a plurality of rolling elements, each sandwiched between the inner and outer raceway surfaces and having a frusto-conical shape in axial cross section, and a collared portion that guides the rolling elements, the tapered roller bearing receiving both a radial load and a thrust load acting on the inner race, and the inner raceway surface located to be offset from a line of action common to a radial component of a contact pressure acting on a contact point between the inner race and the input disk and a radial component of a contact pressure acting on a contact point between the inner race and the output disk toward the outer race.

According to a further aspect of the invention, a dual cavity type toroidal continuously variable transmission with a torque transmission shaft and a pair of variator units set in tandem and coaxially arranged in reverse to each other on the torque transmission shaft, each variator unit comprising input and output disks coaxially arranged with each other and having respective toroidal grooves opposed to each other, a pair of power rollers interposed between the toroidal grooves of the input and output disks under axial preload for power transmission, a pair of trunnions rotatably supporting the respective power rollers to permit tilting motions of the power rollers about trunnion axes for ratio changing, each of the power rollers comprising an inner race that transmits power input to the input disk into the output disk via a traction oil film formed between each of the power rollers and each of the input and output disks, using a shearing force in the traction oil film, an outer race that is supported by the trunnion associated therewith, and a power roller bearing that rotatably supports the inner race to permit relative rotation of the inner race to the outer race, the power roller bearing comprising a tapered roller bearing, the tapered roller bearing including an inner raceway surface formed on the inner race, an outer raceway surface formed on the outer race, a plurality of rolling elements, each sandwiched between the inner and outer raceway surfaces and having a frusto-conical shape in axial cross section, and a collared portion that guides the rolling elements, the tapered roller bearing receiving both a radial load and a thrust load acting on the inner race, the inner raceway surface located to be offset from a line of action common to a radial component of a contact pressure acting on a contact point between the inner race and the input disk and a radial component of a contact pressure acting on a contact point between the inner race and the output disk toward the outer race, and a power-roller inner-race inner peripheral portion, located inside of the inner raceway surface and facing toward the torque transmission shaft serving as a common rotation axis of the input and output disks, is formed as a solid cross section structure.

The other objects and features of this invention will become understood from the following description with reference to the accompanying drawings.

DESCRIPTION OF THE PREFERRED EMBODIMENTS

Figure 1:
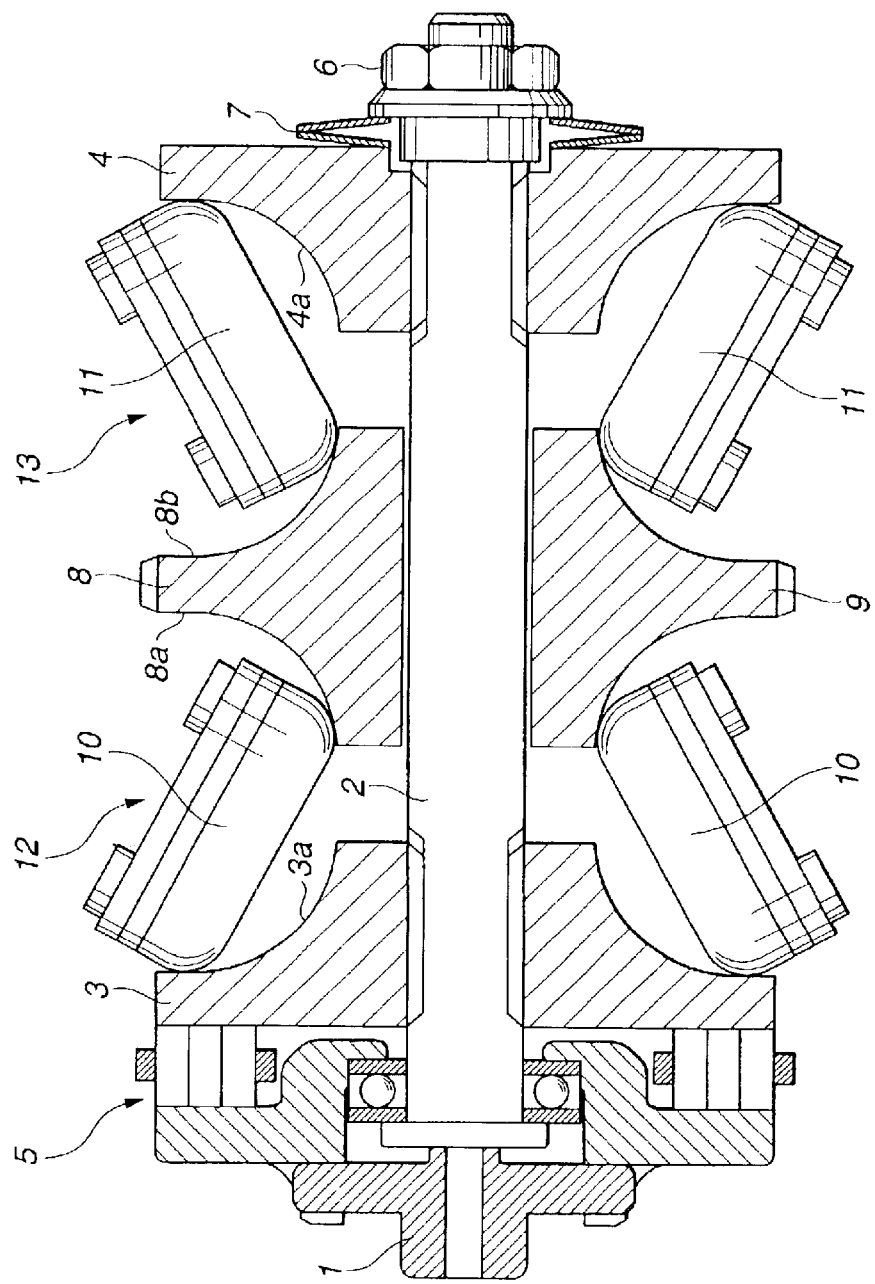
FIG. 1 is a longitudinal cross-sectional view illustrating a ratio change mechanism of a toroidal CVT of a first embodiment.
Figure 2:
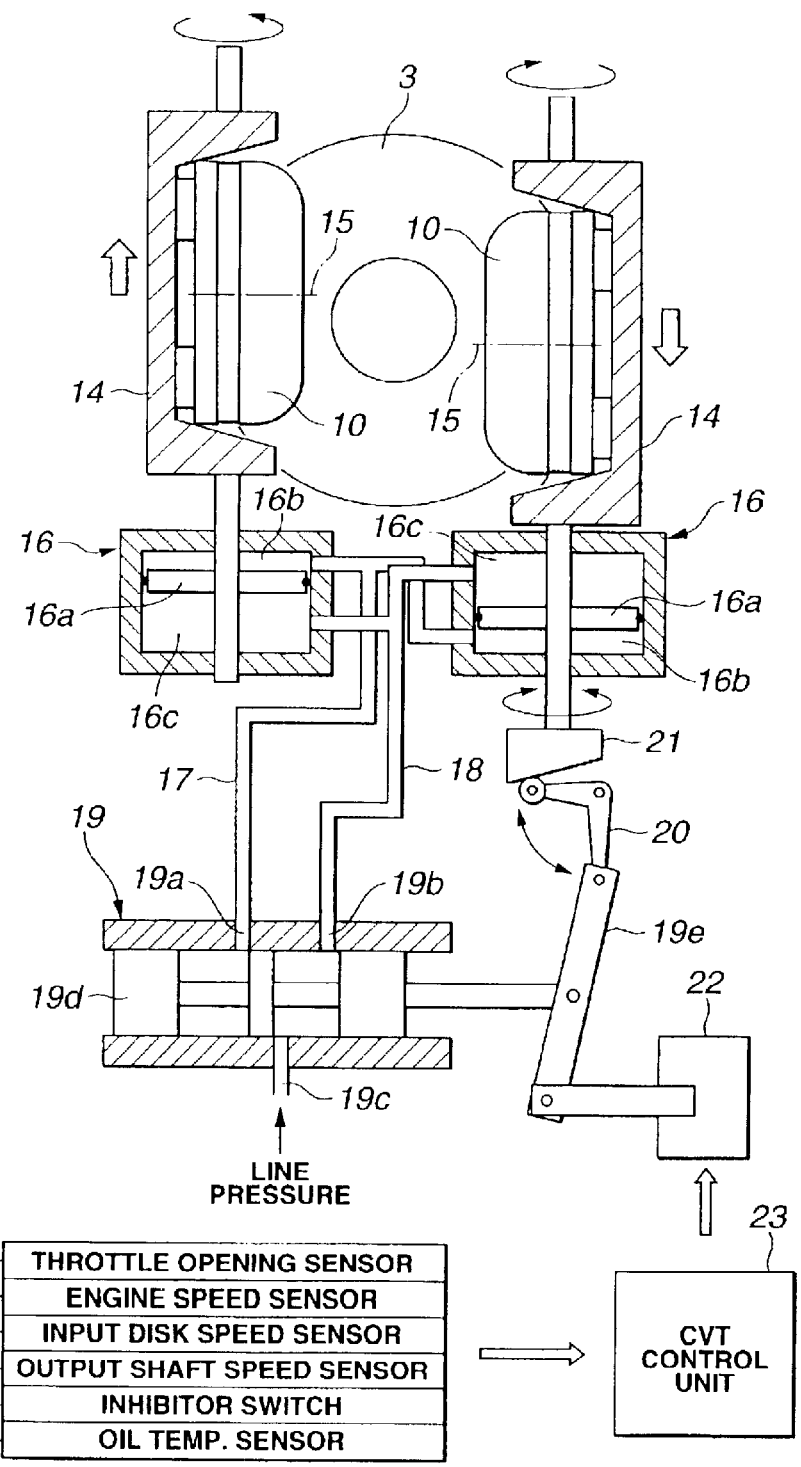
FIG. 2 is a system diagram illustrating a ratio change control system of the toroidal CVT of the first embodiment.

Referring now to the drawings, particularly to FIG. 1, a toroidal continuously variable transmission (toroidal CVT) of the first embodiment is exemplified in a half-toroidal continuously variable transmission. In the power train for the toroidal CVT of the embodiment shown in FIG. 1, engine torque (driving torque) is transmitted from an engine (serving as a prime mover) via a lock-up torque converter (now shown) to a forward and reverse changeover mechanism (not shown). The forward and reverse changeover mechanism (F/R changeover mechanism) functions to transmit input rotation to an input shaft 1 of the toroidal CVT without changing a direction of rotation in a drive range (D range) of a forward running mode. A torque transmission shaft 2 is coaxially arranged with input shaft 1. Each of a first input disk 3 and a second input disk 4 is supported on both ends of torque transmission shaft 2 by way of spline engagement, so as to permit each of first and second input disks 3 and 4 to axially move relative to torque transmission shaft 2, and to rotate about torque transmission shaft 2. The F/R changeover mechanism also functions to transmit input rotation to toroidal CVT input shaft 1 while changing a direction of the input rotation in a reverse range (R range). In this manner, the F/R changeover mechanism reversibly transmits the input rotation of the prime mover to the input disk. As is generally known, the F/R changeover mechanism further functions to shut off power transmission to the toroidal CVT input shaft in a parking range (P range) or a neutral range (N range). The F/R changeover mechanism is generally comprised of a planetary gearset, a forward clutch, and a reverse brake. At the subsequent stage of the F/R changeover mechanism, a front toroidal CVT mechanism (or a first variator unit) 12 and a rear toroidal CVT mechanism (or a second variator unit) 13 are set in tandem and coaxially arranged in the interior space of the toroidal CVT casing so as to construct a "dual cavity type toroidal CVT". First and second CVT mechanisms 12 and 13 are arranged in reverse to each other on torque transmission shaft 2. A loading cam device 5 is interposed between the backface of first input disk 3 and toroidal CVT input disk 1 to produce a magnitude of axial preload (thrust) substantially proportional to input torque transmitted to the loading cam device. A coned disc spring 7 is disposed between the backface of second input disk 4 and a nut 6 threadably engaged with a right-hand screw-threaded end portion of torque transmission shaft 2 so as to axially preload both of first and second input disks 3 and 4. An output disk unit 8 is loosely fitted onto the outer periphery of torque transmission shaft 2 and located midway between first and second input disks 3 and 4 such that the output disk is rotatable relative to torque transmission shaft 2. Output disk unit 8 is comprised of a first output disk portion having a torus surface or a toroidal groove 8a facing a torus surface or a toroidal groove 3a of first input disk 3, and a second output disk portion having a torus surface or a toroidal groove 8b facing a torus surface or a toroidal groove 4a of second input disk 4. That is, output disk unit 8 is constructed by integrally connecting the backface of the first output disk portion to the backface of the second output disk or by forming the first and second output disk portions integral with each other as a unit. Output disk unit 8 is formed on the outer periphery with an output gear 9. First power rollers 10, 10 are interposed between toroidal groove 3a of first input disk 3 and toroidal groove 8a of first output disk portion of output disk unit 8 opposing each other, so that first power rollers 10, 10 are in contact with toroidal grooves 3a and 8a of first input disk 3 and the first output disk portion of output disk unit 8 under axial preload so as to transmit engine power from first input disk 3 to the first output disk portion via a traction oil film formed between each first power roller 10 and each of first input disk 3 and the first output disk portion, using a shearing force in the traction oil film at high contact pressure. First power rollers 10, 10 are symmetrically arranged to each other with respect to the axis of torque transmission shaft 2, that is, a common rotation axis of the input and output disks coaxially arranged with and opposed to each other. In the same manner, second power rollers 11, 11 are interposed between toroidal groove 4a of second input disk 4 and toroidal groove 8b of second output disk portion of output disk unit 8 opposing each other, so that second power rollers 11, 11 are in contact with toroidal grooves 4a and 8b of second input disk 4 and the second output disk portion of output disk unit 8 under axial preload so as to transmit engine power from second input disk 4 to the second output disk portion via a traction oil film formed between each second power roller 11 and each of second input disk 4 and the second output disk portion, using a shearing force in the traction oil film at high contact pressure. Second power rollers 11, 11 are symmetrically arranged to each other with respect to the common rotation axis of the input and output disks. First and second toroidal CVT mechanisms 12 and 13 have almost the same in construction. First toroidal CVT mechanism 12 is comprised of first input disk 3, the first output disk portion of output disk unit 8 coaxially arranged and opposing each other, first power rollers 10, 10, power roller supports or trunnions (described later), and servo pistons (described later) each serving as a hydraulic actuator. On the other hand, second toroidal CVT mechanism 13 is comprised of second input disk 4, the second output disk portion of output disk unit 8 coaxially arranged and opposing each other, second power rollers 11, 11, power roller supports or trunnions (described later), and servo pistons (described later) each serving as a hydraulic actuator. The details of the ratio change control system of the toroidal CVT of the first embodiment are described hereunder in reference to the system diagram of FIG. 2 showing the control system associated with first toroidal CVT mechanism 12.

Each of first and second power rollers 10, 10, 11, 11 is supported on one end of each of trunnions 14, 14, 14, 14. Power rollers 10, 10, 11, 11 are rotatable about the respective power-roller rotation axes 15, 15, 15, 15. Each of hydraulic servo pistons 16, 16, 16, 16, serving as a hydraulic servo mechanism, is coaxially connected onto the other end of each of the trunnions, so as to tilt each of the power rollers by shifting trunnions 14, 14 of first toroidal CVT mechanism 12 in opposite directions of their trunnion axes perpendicular to the power-roller rotation axes and by shifting trunnions 14, 14 of second toroidal CVT mechanism 13 in opposite directions of their trunnion axes perpendicular to the power-roller rotation axes. That is, all of the trunnions are shifted in phase and synchronously with each other by means of the four servo pistons. For such synchronous motion of four trunnions 14, 14, 14, 14, the four trunnions are mechanically linked to each other by means of a synchronous wire. As clearly shown in FIG. 2, as a hydraulic control system for motion control of servo pistons 16, 16, a ratio-change-to-high hydraulic circuit 17, a ratio-change-to-low hydraulic circuit 18, and a ratio control valve 19 are provided. As can be seen in FIG. 2, each of two hydraulic servo pistons 16, 16 associated with first toroidal CVT mechanism 12 has a piston 16a that divides an internal space of the servo piston into a ratio-change-to-high hydraulic pressure chamber 16b and a ratio-change-to-low hydraulic pressure chamber 16c. Ratio-change-to-high hydraulic circuit 17 (hereinafter is referred to as "first hydraulic circuit") is connected to ratio-change-to-high hydraulic pressure chambers 16b, 16b of two hydraulic servo pistons 16, 16 associated with first toroidal CVT mechanism 12. In contrast, ratio-change-to-low hydraulic circuit 18 (hereinafter is referred to as "second hydraulic circuit") is connected to ratio-change-to-low hydraulic pressure chambers 16c, 16c of two hydraulic servo pistons 16, 16 associated with first toroidal CVT mechanism 12. Ratio control valve 19 has a port 19a connected to first hydraulic circuit 17 and a port 19b connected to second hydraulic circuit 18. A line pressure is supplied from a hydraulic pressure source, including an oil pump (not shown) and a relief valve (not shown), into a line-pressure port 19c of ratio control valve 19. A spool 19d of ratio control valve 19 serves to detect the direction of axial motion of each of trunnions 14, 14 and the direction of tilting motion of each of trunnions 14, 14. Ratio control valve 19 further includes an I-shaped link lever 19e whose central portion is mechanically linked or pin-connected to spool 19d, so that both the direction of axial motion and the direction of tilting motion of trunnion 14 are mechanically fed back to ratio control valve 19, and thus a degree of progress for transmission-ratio changing is mechanically fed back to the hydraulic servo mechanism, that is, the hydraulic servo pistons by means of a feedback mechanism including an L-shaped link lever 20 and a precision cam 21. Concretely, one end of I-shaped link lever 19e is linked or pin-connected to the front end of a motor driven shaft of a step motor 22 in such a manner as to create a displacement of the one end of I-shaped link lever 19e in an axial direction of spool 19d. That is, spool 19d can be axially moved by means of step motor 22. There is a one-to-one correspondence between the displacement of the one end of I-shaped link lever 19e and the ratio command signal value (the desired transmission ratio). The other end of I-shaped link lever 19e is linked or pin-connected to precision cam 21 via L-shaped link 20 in operative engagement with the cam profile of precision cam 21. The precision cam is linked to the trunnion shaft of trunnion 14 so as to transmit axial motion of the trunnion to I-shaped link lever 19e and to feedback the gyration angle of power roller 10 to the I-shaped link lever. In the forward running mode, for example in the D range, the degree of progress for ratio changing is mechanically fed back to the hydraulic servo mechanism via the precision cam. Step motor 22 is controlled in response to a control signal from an electronic CVT control unit 23. CVT control unit 23 (CVT controller) generally comprises a microcomputer. CVT control unit 23 includes an input/output interface (I/O), memories (RAM, ROM), and a microprocessor or a central processing unit (CPU). The input/output interface (I/O) of CVT control unit 23 receives input information from various engine/vehicle switches and sensors, namely a throttle opening sensor 24, an engine speed sensor 25, an input disk speed sensor 26, an output shaft speed sensor 27, an inhibitor switch 28, and an oil temperature sensor 29. Within CVT control unit 23, the central processing unit (CPU) allows the access by the I/O interface of input informational data signals from the previously-discussed engine/vehicle switches and sensors. The CPU of CVT control unit 23 is responsible for carrying the toroidal CVT ratio change control program stored in memories and is capable of performing necessary arithmetic and logic operations for the toroidal CVT ratio change control. Computational results (arithmetic calculation results), that is, a calculated output signal (a control signal) is relayed via the output interface circuitry of the CVT control unit to an output stage, namely step motor 22.

Figure 3:
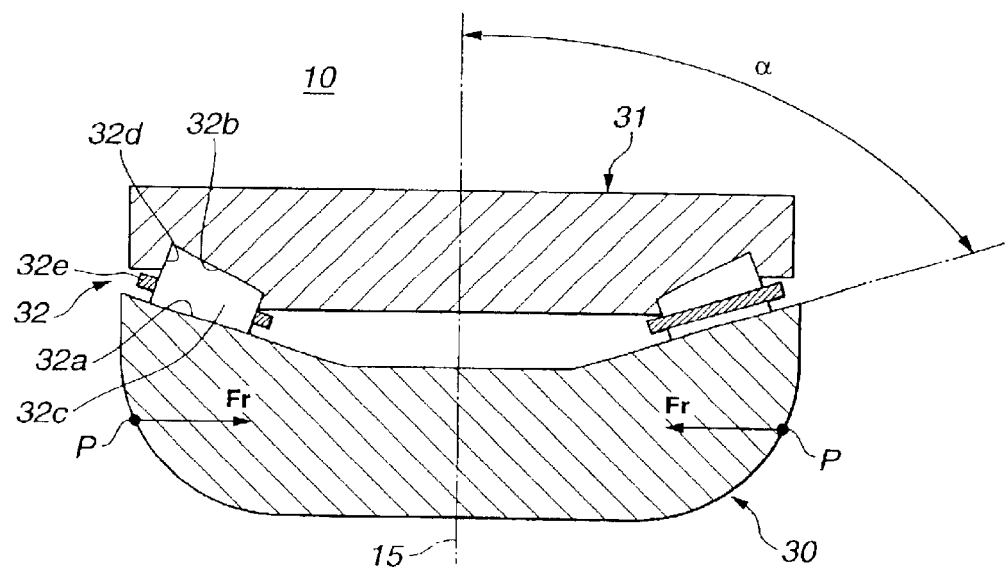
FIG. 3 is a cross section of a power roller incorporated in the toroidal CVT of the first embodiment.

Referring now to FIG. 3, there is shown the detailed cross section structure of each of power rollers 10, 10, 11, 11 used for the toroidal CVT of the first embodiment.

Figure 4:
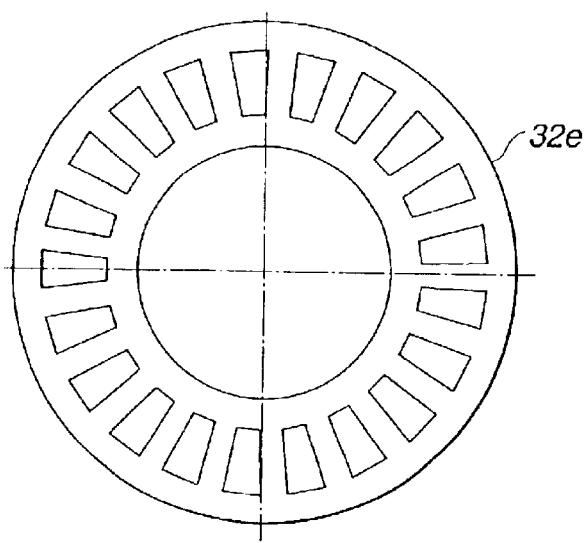
FIG. 4 is a plan view illustrating a cage of a tapered roller bearing of the power roller of the toroidal CVT of the first embodiment.

Power roller 10 is comprised of an inner race 30, and outer race 31, and a tapered roller bearing 32. Inner race 30 serves to transmit the power input to first input disk 3 into the first output disk portion of output disk unit 8 via a traction oil film formed between power roller 10 and each of the first input and output disks, using a shearing force in the traction oil film at high contact pressure. Outer race 31 is slidably or pivotably supported on the associated trunnion 14. Tapered roller bearing 32 functions to rotatably support inner race 30 to permit relative rotation of inner race 30 to outer race 31. As clearly shown in FIG. 3, tapered roller bearing 32 serves as a power roller bearing. Concretely, tapered roller bearing 32 is comprised of an inner raceway surface 32a formed on inner race 30, an outer raceway surface 32b formed on outer race 31, a plurality of tapered rollers (rolling elements) 32c sandwiched between the inner and outer raceway surfaces 32a and 32b, a collared portion 32d that guides tapered rollers 32c, and a cage 32e (see FIG. 4) that retains tapered rollers 32c while permitting rotation of each tapered roller 32c about its rotation axis. The power roller bearing is constructed as tapered roller bearing 32 by using tapered rollers (rolling elements) 32c each having a frusto-conical shape in axial cross section.

As clearly shown in FIG. 3, the previously-noted inner raceway surface 32a is located to be offset from a contact point P between the inner race 30 and the input disk 3 and a contact point P between the inner race 30 and the output disk 8 toward the outer race 31. Contact point P corresponds to a point of action of the radial component Fr of contact pressure Fc. Additionally, a power-roller inner-race inner peripheral portion, located inside of the inner raceway surface 32a and facing toward the common rotation axis of the input and output disks, is formed as a solid cross section structure. Furthermore, a contact angle $\alpha$ of inner raceway surface 32a is dimensioned or set to be within a predetermined contact angle range of 50° to 75° As can be seen from the cross section of FIG. 3, a radial bearing that receives a radial load acting on inner race 30 is not used. The radial load and thrust load both acting on inner race 30 are all supported or received by means of tapered roller bearing 32.

With the previously-discussed power roller bearing structure, the toroidal CVT of the first embodiment operates as follows.

For the purpose of the ratio changing control of the toroidal CVT, as shown in FIG. 2, CVT control unit 23 operates to shift trunnions 14, 14 in two opposite directions (upward and downward directions in FIG. 2) of their trunnion axes. As a result, each of power rollers 10, 10 is tilted. More concretely, stepmotor 22 is rotated in response to a ratio command signal (corresponding to a desired transmission ratio) from CVT control unit 23, thereby causing an axial displacement of spool 19d of ratio control valve 19. Thus, working oil is introduced into one of servo piston chambers (ratio-change-to-high hydraulic pressure chamber 16b and ratio-change-to-low hydraulic pressure chamber 16c) of each of servo pistons 16, 16 associated with trunnions 14, 14 of power rollers 10, 10. At the same time, the working oil is drained from the other of servo piston chambers (ratio-change-to-high hydraulic pressure chamber 16b and ratio-change-to-low hydraulic pressure chamber 16c) of each servo piston 16. As a consequence, trunnions 14, 14 are shifted in the two opposite directions of their trunnion axes, and therefore power rollers 10, 10 are shifted from their neutral positions in phase and in synchronization with each other in directions of trunnion axes perpendicular to power-roller rotation axes 15, 15. The neutral position corresponds to a non-ratio-changing position at which the power-roller rotation axis 15 intersects the common rotation axis of the input and output disks. Shifting power rollers 10, 10 from their neutral positions causes an offset (a vertical displacement) of each of power-roller rotation axes 15, 15 from the common rotation axis of the input and output disks. Owing to the offset or vertical displacement of each of power-roller rotation axis 15, 15, a side slip force occurs in a very limited contact zone between each of power rollers 10, 10 and the associated input and output disks 3 and 8. By virtue of the side slip forces, the power rollers can be self-tilted or self-inclined in phase and in synchronization about the respective trunnion axes. Owing to the self-inclining motion of each of the power rollers, a first diameter of a circular-arc shaped locus drawn by movement of the very limited contact point P between each of the power rollers and the output disk on the torus surface of the output disk and a second diameter of a circular-arc shaped locus drawn by movement of the very limited contact point P between each of the power rollers and the input disk on the torus surface of the input disk, that is, a ratio of the first diameter to the second diameter can be continuously varied, thus continuously varying a transmission ratio of the dual cavity type toroidal CVT. The previously-discussed self-tilting motion of each power roller, or the offset of each power-roller rotation axis 15, in other words, a degree of progress for transmission-ratio changing is mechanically fed back to the hydraulic servo mechanism, that is, servo pistons 16, 16 via spool 19d of ratio control valve 19 by means of precision cam 21 (exactly, a forward precision cam in the forward running mode) and L-shaped link lever 20 and by means of precision cam 21 (exactly, a reverse precision cam in the reverse running mode), such that each of the trunnions gradually returns to its initial position as the ratio changing progresses or advances. At this time, the actual axial position of spool 19d is determined depending on both the degree of progress for transmission-ratio changing mechanically fed back to the other end of I-shaped link lever 19e and the shifting amount of the one end of I-shaped link lever 39 shifted responsively to the ratio command signal by step motor 22. As soon as the gyration angle based on the desired transmission ratio corresponding to a transmission-ratio command signal value has been reached, the offset or vertical displacement of each of the trunnions is returned to zero, so as to stop the inclining motion of each power roller, and to attain the return of each power roller to neutral, and thus to maintain the desired transmission ratio corresponding to the ratio command signal value. The transmission ratio is determined depending on the tilting angle of each of the power rollers.

Figure 11:
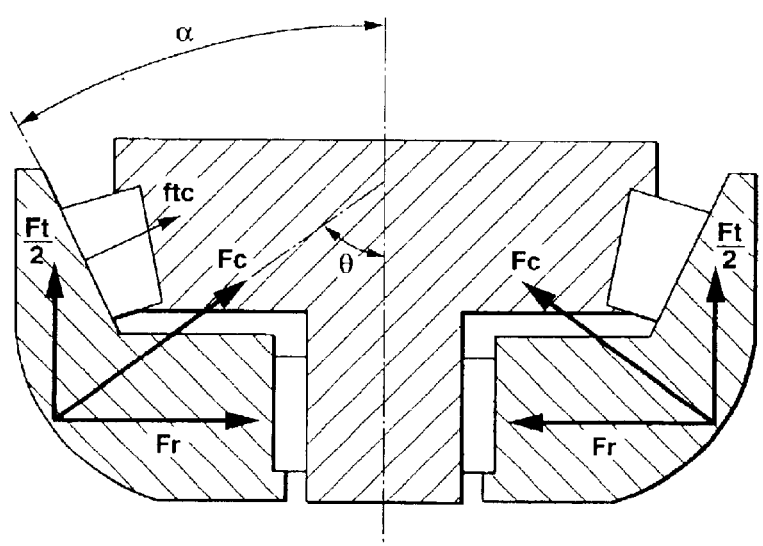
FIG. 11 is an explanatory drawing showing vector analysis for applied forces Fc, Fc acting on the power-roller inner race and an applied load ftc acting on one rolling element of the tapered roller bearing.
Figure 12:
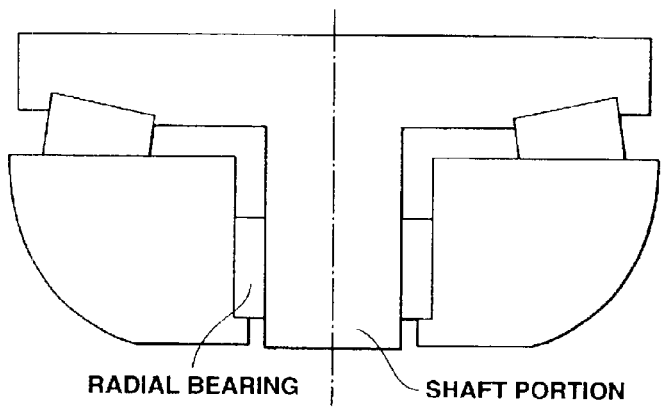
FIG. 12 is a simplified drawing showing an example of a power roller bearing structure having a radial bearing as well as a tapered roller bearing.
Figure 13:
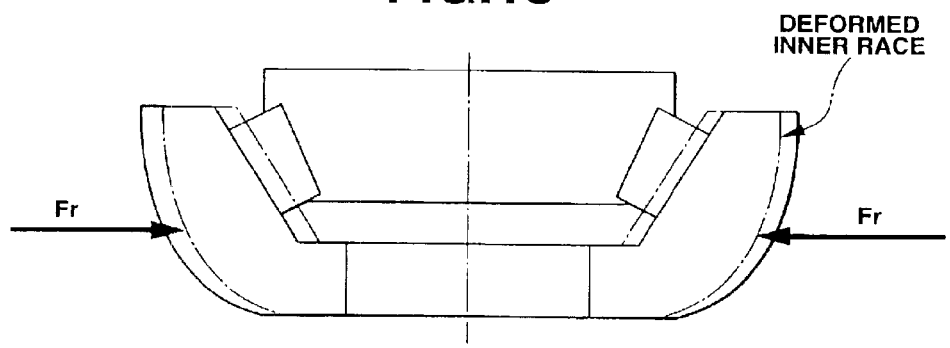
FIG. 13 is an explanatory drawing showing a state of deformation of the power-roller inner race having a comparatively large hollow cross section.
Figure 14:
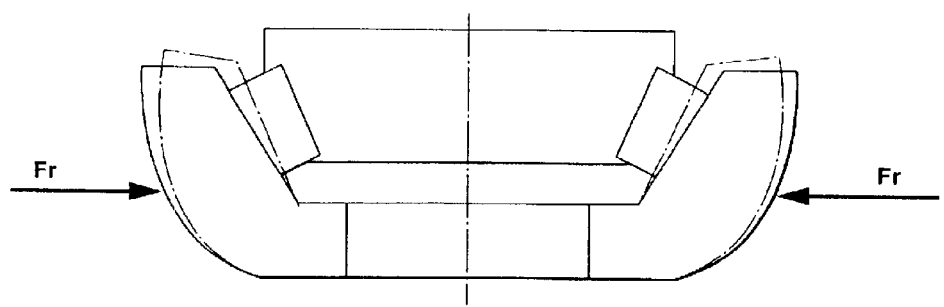
FIG. 14 is an explanatory drawing showing a state of deformation of the power-roller inner race whose inner peripheral portion is formed as a partially solid cross section structure or as a comparatively higher radial rigidity portion than the power-roller inner-race outer peripheral portion.

As can be appreciated from vector analyses shown in FIGS. 11, 13 and 14, a pair of contact pressures Fc, Fc is applied to each power roller 10 via each of the input and output disks, since the power rollers are in contact with the toroidal grooves of the associated input and output disks under axial preload so as to transmit engine power from the input disk to the output disk via a traction oil film formed between each of the power rollers and each of the input and output disks, using a shearing force in the traction oil film at high contact pressure. A radial component Fr of the first contact pressure Fc applied via the input disk to the power-roller inner race and a radial component Fr of the second contact pressure Fc applied via the output disk to the power-roller inner race are cancelled to each other in the form of internal stresses created in the power-roller inner race, since these two radial components (Fr, Fr) have the same magnitude and the same line of action but different sense. However, during application of radial components (Fr, Fr) having the same magnitude and the same line of action but different sense, the power-roller inner race tends to deform. Assuming that the inner race is formed as a hollow-cross-section power-roller inner race structure (see FIG. 13) having a comparatively large inverted frusto-conical hollow, the degree of deformation of the inner race is relatively large, and as a result the rolling elements of the tapered roller bearing may be put between the inner raceway surface and the outer raceway surface under high pressure. That is, radial components Fr, Fr cannot be sufficiently canceled in the form of internal stresses created in the power-roller inner race. A portion of each radial component Fr must be supported by way of the tapered roller bearing. In contrast to the above, in case of the improved tapered roller bearing 32 of the toroidal CVT of the first embodiment having an almost solid cross section structure shown in FIG. 3, inner raceway surface 32a is located to be offset from contact point P between the inner race 30 and the input disk 3 and a contact point P between the inner race 30 and the output disk 8 toward the outer race 31, and additionally, the power-roller inner-race inner peripheral portion, located inside of the inner raceway surface 32a and facing toward the common rotation axis of the input and output disks, is formed as a solid cross section structure. As appreciated from the cross section of FIG. 3, the inner-race portion lying on the line of action of each radial component Fr is a solid cross section structure having a high rigidity. In case of the solid cross section structure shown in FIG. 3, there is a less deformation of inner race 30 owing to radial components (Fr, Fr). In other words, there is hardly any radial component Fr acting on tapered rollers 32c of tapered roller bearing 32. This enhances the fatigue life of tapered rollers 32c of tapered roller bearing 32.

Figure 9:
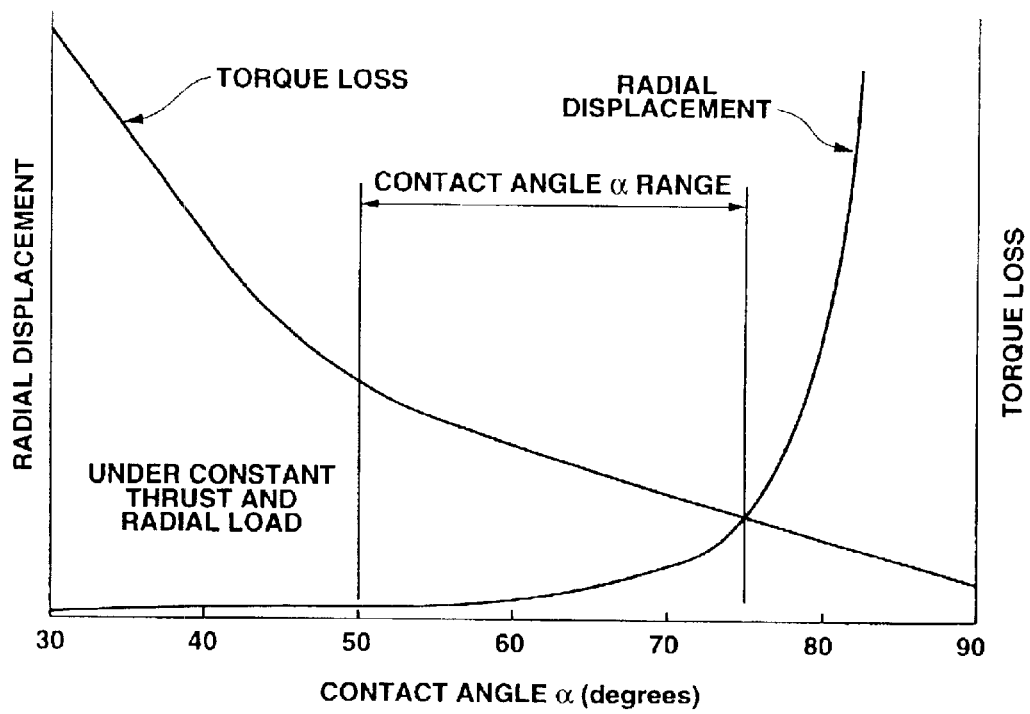
FIG. 9 is a characteristic diagram illustrating the relationship among the contact angle α between the inner raceway surface and the power-roller rotation axis, torque loss, and radial displacement of the inner race to the outer race.
Figure 10:
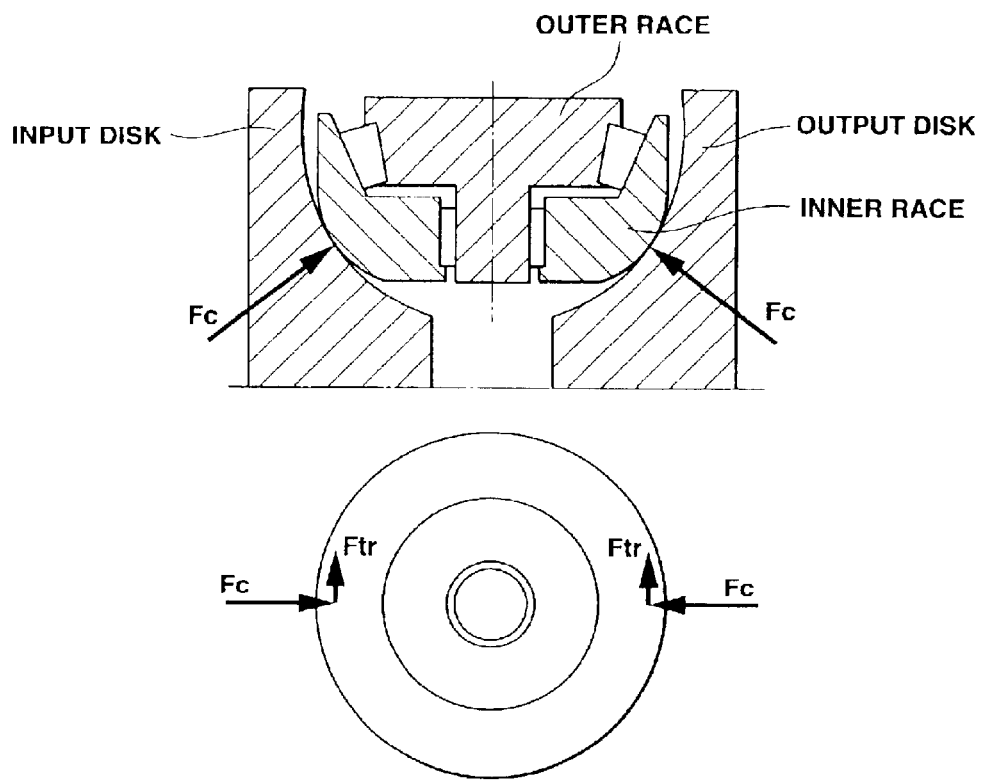
FIG. 10 is an explanatory drawing showing analytical mechanics for applied forces Fc, Fc, Ftr, Ftr acting on the power-roller inner race.

FIG. 9 shows a contact-angle $\alpha$ versus torque loss characteristic curve and a contact-angle $\alpha$ versus radial displacement characteristic curve, both obtained under the predetermined constant thrust and radial load. These characteristic curves are experimentally assured by the inventor of the present invention. As can be seen from the contact-angle $\alpha$ versus torque loss characteristic curve showing how the torque loss occurring at the tapered roller bearing varies relative to contact angle $\alpha$, when contact angle $\alpha$ exceeds 50 degrees, the magnitude of torque loss tends to remarkably decrease. As can be seen from the contact-angle $\alpha$ versus radial displacement characteristic curve showing how the radial displacement of inner race 30 to outer race 31 varies relative to contact angle $\alpha$, when contact angle $\alpha$ becomes less than or equal to 75 degrees, the radial displacement tends to remarkably rapidly decrease. That is to say, under a specified condition that contact angle $\alpha$ of inner raceway surface 32a is dimensioned or set to be within a predetermined range of 50° to 75°, it is possible to effectively reduce the torque loss occurring at tapered roller bearing 32, while assuring a desired radial rigidity of the tapered-roller-bearing inner race structure. Therefore, the improved tapered roller bearing structure of the first embodiment eliminates the necessity of an additional radial bearing that is used to provide lateral support to the power-roller shaft portion, and also eliminates the necessity of a shaft portion extending along the power-roller rotation axis for supporting the radial bearing. This reduces total manufacturing costs of toroidal CVTs.

Figure 5:
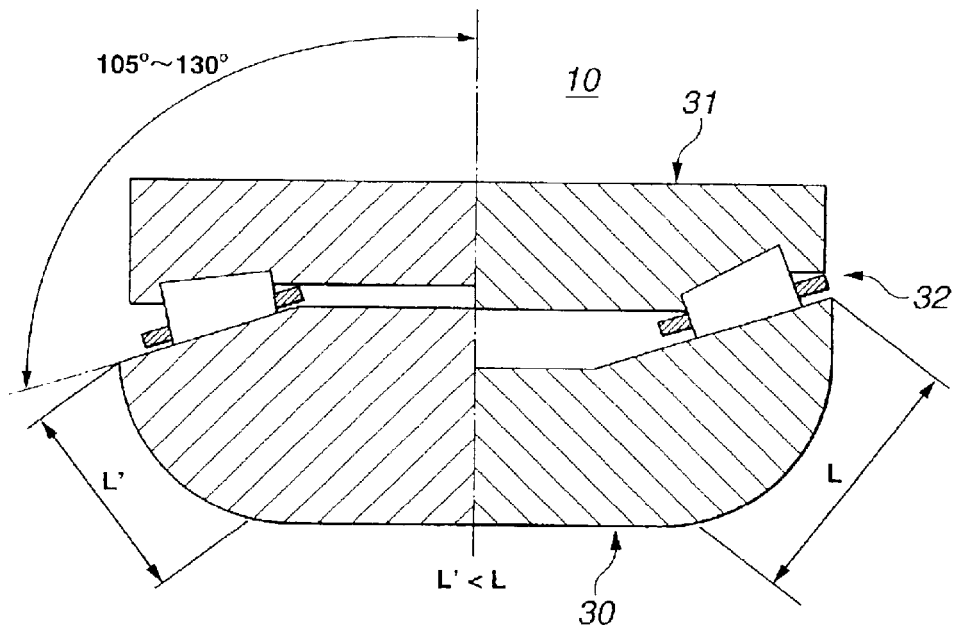
FIG. 5 shows a power-roller cross-section structure of a comparative example (see a left-hand cross section of FIG. 5) that a contact angle α is dimensioned to be within a specified range of 105° to 130°, and shows a power-roller cross-section structure of the first embodiment (see a right-hand cross-section of FIG. 5) that a contact angle α is dimensioned to be within a specified range of 50° to 75°.

Taking account of only the previously-discussed expression (2), that is, ftc=Ft/Z/sin $\alpha$, where ftc is the applied load per rolling element, Ft is the sum of axial component Ft/2 of the first contact pressure Fc and axial component Ft/2 of the second contact pressure Fc (see FIG. 11), and Z is the number of rolling elements (tapered rollers 32c) of tapered roller bearing 32, the previously-noted predetermined contact angle $\alpha$ range of 50° to 75° is equivalent to a predetermined contact angle $\alpha$ range of 105° to 130°, because of $\sin(50°)=\sin(130°)$ and $\sin(75°)=\sin(105°)$. In other words, the applied load ftc per rolling element in the two different contact angle $\alpha$ ranges, namely the first contact angle $\alpha$ range of 50° to 75° and the second contact angle $\alpha$ range of 105° to 130°, for the same thrust and radial load, is the same. However, in case of the second contact angle $\alpha$ range of 105° to 130° (see the left-hand cross section of FIG. 5), there is a problem discussed below. As a matter of course, an inner-race contact length L', that is, an inner-race contact surface area that can be brought into contact with the input and output disks in case of the second contact angle $\alpha$ range ($105°\leq\alpha\leq130°$) is dimensioned to be comparatively less than an inner-race contact length L, that is, an inner-race contact surface area that can be brought into contact with the input and output disks in case of the first contact angle $\alpha$ range ($50°\leq\alpha\leq75°$). If the magnitude of contact pressure Fc is excessively great, the relatively narrower inner-race contact surface area (or the relatively shorter inner-race contact length L') cannot adequately cover a predetermined elliptical orbit of the contact area between the power roller and the input and output disks. In such a case, there is a possibility of occurrence of a so-called "edge load" at the edged portion joining the curved inner-race contact surface area and the inner raceway surface area. The edge load shortens a fatigue life of the tapered roller bearing and reduces a power transmission efficiency. To avoid this, it is preferable to set an optimal contact angle $\alpha$ range at the first contact angle $\alpha$ range of 50° to 75°.

Japanese Patent provisional Publication No. 2001-4003 teaches that the revolution speed difference exists among a plurality of rolling elements revolving around the central axis of their cage in presence of a large radial displacement of inner race to the outer race, produced by a radial component of a contact pressure created by axial load (loading cam force). That is, due to the revolution speed difference, there is a possibility of collision-contact between cage 32e and tapered rollers (rolling elements) 32c, in the presence of such a large radial displacement of the inner race to the outer race. This leads to the problem of increased cage wear. As set forth above, in the improved tapered roller bearing structure of the first embodiment, contact angle $\alpha$ is dimensioned to be less than or equal to 75° below which the radial displacement of inner race 30 to outer race 31 is rapidly reduced or effectively suppressed. Thus, according to the tapered roller bearing of the first embodiment having contact angle $\alpha$ less than or equal to 75°, there is a less possibility of undesired collision-contact between cage 32e and tapered rollers (rolling elements) 32c, thus effectively suppressing undesirable cage wear. The improved tapered roller bearing structure of the first embodiment has the following effects.

According to the tapered roller bearing structure of the toroidal CVT of the first embodiment shown in FIG. 3, radial load and thrust load both acting inner race 30 are all supported by means of only the tapered roller bearing 32 without using any radial bearing. Additionally, inner raceway surface 32a is located or positioned to be offset from contact point P between inner race 30 and input disk 3 and contact point P between inner race 30 and output disk 8 toward outer race 31. Actually, the inner-race portion lying on the line of action (containing the contact points P, P) of each radial component Fr is a solid cross section structure having a high rigidity. Thus, it is possible to minimize deformation of inner race 30, occurring due to application of radial components (Fr, Fr) having the same magnitude and the same line of action but different sense. Therefore, there is hardly any radial component Fr acting on tapered rollers 32c of tapered roller bearing 32, thereby preventing the rolling-element fatigue life to be lowered. In addition to the above, contact angle α of inner raceway surface 32a is dimensioned or set to be 75° or less, thereby effectively suppressing the radial displacement of inner race 30 to outer race 31 and thus ensuring a predetermined radial rigidity. For the reasons set out above, there is no necessity of an additional radial bearing used to provide lateral support to the power-roller shaft portion and there is no necessity of a shaft portion extending along the power-roller rotation axis for supporting the radial bearing. This reduces manufacturing costs of toroidal CVTs. More preferably, in the improved tapered roller bearing of the toroidal CVT of the first embodiment, contact angle α is dimensioned or set to be within the predetermined contact angle α range that is defined by an inequality $50° \leq \alpha \leq 75°$ (see FIG. 9). Thus, it is possible to reconcile both high radial rigidity and reduced torque loss.

Figure 6:
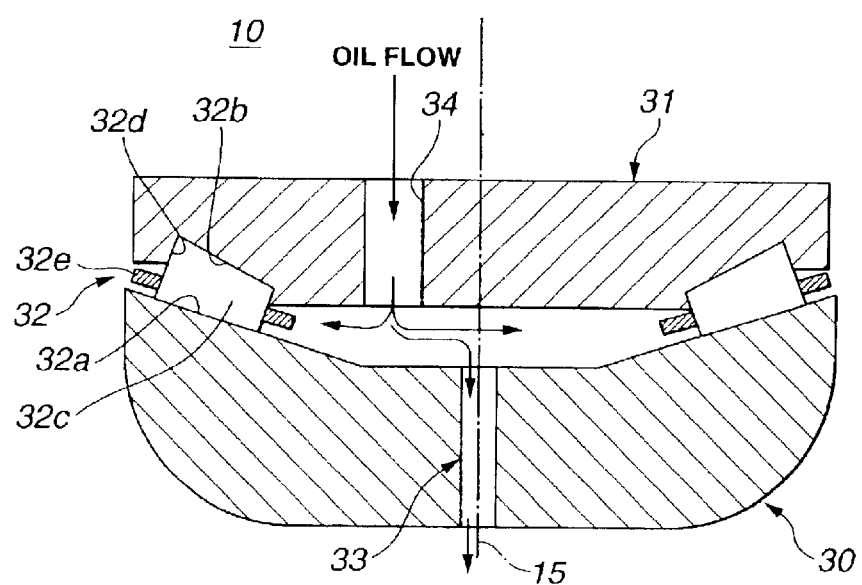
FIG. 6 is a cross section of a power roller incorporated in a toroidal CVT of a second embodiment.

Referring now to FIG. 6, there is shown the power roller structure of the toroidal CVT of the second embodiment. The power roller structure (containing the tapered roller bearing structure) of the toroidal CVT of the second embodiment is similar to that of the first embodiment. In explaining the second embodiment, for the purpose of simplification of the disclosure, the same reference signs used to designate elements in the first embodiment will be applied to the corresponding elements used in the second embodiment, while detailed description of the same reference signs will be omitted because the above description thereon seems to be self-explanatory. The power roller structure of the toroidal CVT of the second embodiment is different from that of the first embodiment, in that first and second axial oil passages 33 and 34 are further formed in power roller 10, for lubrication of rolling contact surfaces between the power roller and input and output disks and lubrication of the tapered roller bearing. In the second embodiment, first axial oil passage 33 is formed as a central through-opening bored in inner race 30 in such a manner as to axially extend along power-roller rotation axis 15 (that is, the rotation axis of inner race 30). Second axial oil passage 34 is formed as an oil supply passage bored in outer race 31 in such a manner as to extend parallel to power-roller rotation axis 15. As appreciated from the lubricating oil flow indicated by the plurality of arrows in FIG. 6, lubricating oil (traction oil) flows from second oil passage 34 via the internal space of the tapered roller bearing defined between two opposing surfaces of inner and outer races 30 and 31 into first oil passage 33. As discussed above, the lubrication system comprised of the comparatively simple lubricating oil passage structure (33, 34) formed in inner and outer races 30 and 31 of power roller 10, ensures lubricating oil (traction oil) to reliably be fed to rolling contact surfaces between the power-roller inner race and input and output disks and to the tapered roller bearing. This eliminates the necessity of an additional lubricating oil supply system. In addition to the same effects as the first embodiment, the power roller structure of the toroidal CVT of the second embodiment can provide the following additional effect. That is, first oil passage 33, penetrating the central power-roller rotation axis 15, is bored in inner race 30, and therefore the lubricating oil system is formed as a single lubricating oil system for lubrication of tapered roller bearing 32 and for lubrication of rolling contact surfaces between the power roller and input and output disks. Such a single lubrication system is simple in construction, thus reducing manufacturing costs. This eliminates the necessity of two lubrication systems separated from each other, namely a first lubrication system for lubrication of tapered roller bearing 32 and a second lubrication system for lubrication of rolling contact surfaces between the power roller and input and output disks. In the case that first oil passage 33 is centrally bored in inner race 30, the inner race does not have a complete solid cross section structure. However, the inside diameter of first oil passage 33 is very small in comparison to the inside diameter of a shaft hole into which a shaft portion supporting a radial bearing of the conventional power roller is inserted. Thus, the degree of inner-race deformation of the power roller structure of the toroidal CVT of the second embodiment shown in FIG. 6 is almost the same as the first embodiment shown in FIG. 3.

Figure 7:
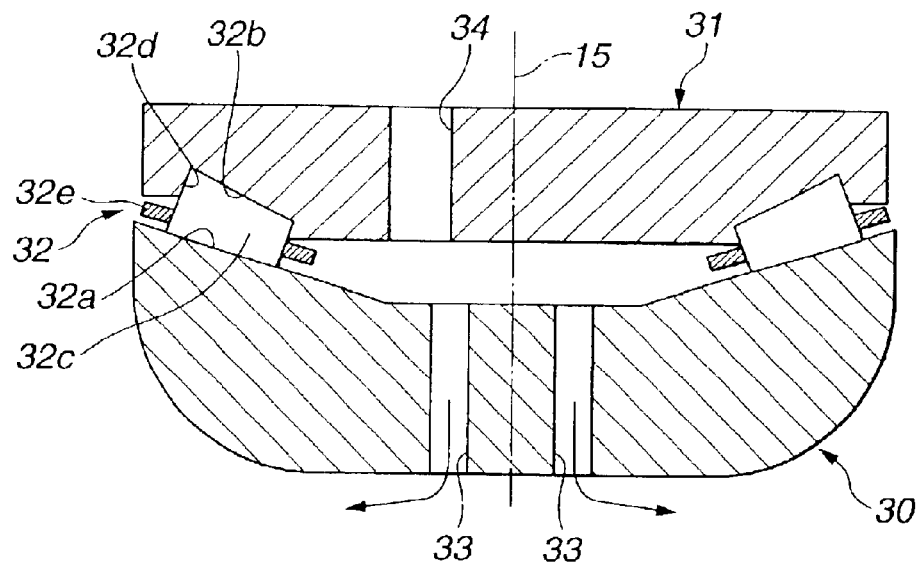
FIG. 7 is a cross section of a power roller incorporated in a toroidal CVT of a third embodiment.

Referring now to FIG. 7, there is shown the power roller structure of the toroidal CVT of the third embodiment. The power roller structure (containing the tapered roller bearing structure) of the third embodiment is similar to that of the second embodiment. The power roller structure of the toroidal CVT of the third embodiment is different from that of the second embodiment, in that in the power roller structure of the third embodiment two parallel axial oil passages 33, 33 are formed in power-roller inner race 30 in such a manner as to be arranged parallel to power-roller rotation axis 15 and to be offset from power-roller rotation axis 15 in a direction normal to power-roller rotation axis 15. During operation of the toroidal CVT, that is, during rotation of the power roller, a centrifugal force acts on lubricating oil flow mass discharged from two parallel axial oil passages 33, 33, and whereby the lubricating oil can be effectively supplied to the rolling contact surfaces between the power roller and input and output disks, while dispersing or breaking away from the power-roller rotation axis. In addition to the same effects as the same effects as the second embodiment, the power roller structure of the toroidal CVT of the third embodiment can provide the following additional effect. The aforementioned two parallel axial oil passages 33, 33, penetrating inner race 30, are located to be axially offset from power-roller rotation axis 15, and therefore there is a reduced tendency for the lubricating oil to drip from outlets of the two parallel axial oil passages owing to the gravitational force, even under a comparatively low lubricating-oil supply pressure. This enhances the lubricating performance for lubrication of rolling contact surfaces between the power roller and input and output disks. For proper lubrication, the number of axial oil passages 33 is determined depending on the size of axial oil passage 33, design lubricating oil quantity, and the like.

Figure 8:
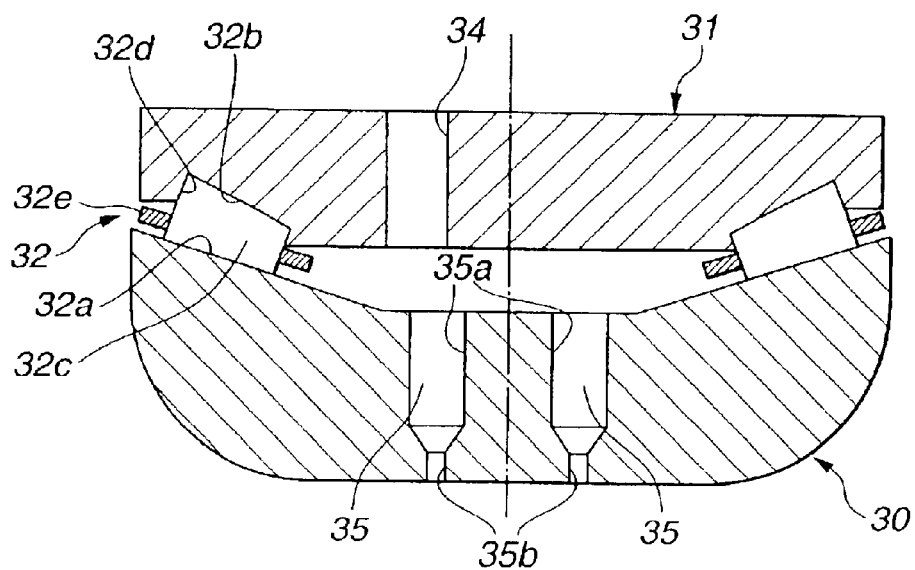
FIG. 8 is a cross section of a power roller incorporated in a toroidal CVT of a fourth embodiment.

Referring now to FIG. 8, there is shown the power roller structure of the toroidal CVT of the fourth embodiment. The power roller structure (containing the tapered roller bearing structure) of the fourth embodiment is slightly different from that of the third embodiment of FIG. 7, in that in the power roller structure of the fourth embodiment each of two parallel axial oil passages bored in and penetrating power-roller inner race 30 are formed as a stepped fluid-flow constriction orifice passage 35. In more detail, as clearly seen from the cross section of FIG. 8, the stepped oil passage 35 is comprised of a relatively larger-diameter inlet oil passage portion 35a and a relatively smaller-diameter outlet oil passage portion 35b coaxially arranged with each other. Assuming that each of two parallel axial oil passages formed in power-roller inner race 30 is formed as an axial through opening and additionally the inside diameter of each axial oil passage bored in power-roller inner race 30 is dimensioned to be excessively large, most of the lubricating oil supplied through the axial oil passage 34 formed in outer race 31 into the internal space of power roller 10 may pass through each of the relatively larger-diameter axial oil passages bored in power-roller inner race 30 with less lubricating-oil flow constriction. In other words, the quantity of lubricating oil directed toward the tapered roller bearing may become insufficient. This shortens the life of tapered roller bearing 32. For this reason, the inside diameter of each axial oil passage bored in power-roller inner race 30 as an axial through opening must be properly small-sized so as to provide proper fluid-flow constriction. In case of the non-radial-bearing equipped power roller of the shown embodiment having the predetermined contact angle α range of 50° to 75°, inner race 30 is comparatively thick-walled. Thus, each axial oil passage bored in power-roller inner race 30 as an axial through opening must be formed as an axially-elongated through-hole having a small inside diameter. Machining such an elongated through-hole having a small inside diameter in the power-roller inner race often results in drill breakage. In contrast, according to the power roller structure of the fourth embodiment shown in FIG. 8, each of two parallel axial oil passages, bored in and penetrating power-roller inner race 30, is formed as a stepped fluid-flow constriction orifice passage 35, which is comprised of relatively larger-diameter inlet oil passage portion 35a and relatively smaller-diameter outlet oil passage portion 35b. As shown in FIG. 8, the axial length of relatively larger-diameter inlet oil passage portion 35a is dimensioned to be considerably greater than that of relatively smaller-diameter outlet oil passage portion 35b. That is to say, the axial length of relatively smaller-diameter outlet oil passage portion 35b, which has to be bored by means of a small-diameter drill having a tendency of easy drill breakage, is very short. Thus, there is a less risk of drill breakage during machining of stepped fluid-flow constriction orifice passage 35. Furthermore, it is possible to prevent excessive lubricating oil flow passing through axial oil passages bored in the power-roller inner race and to provide optimal fluid-flow constriction suited to both (i) lubrication of rolling contact surfaces between the power roller and input and output disks and (ii) lubrication of the tapered roller bearing by properly setting the orifice size of relatively smaller-diameter outlet oil passage portion 35b of stepped fluid-flow constriction orifice passage 35. In other words, machining the previously-noted stepped fluid-flow constriction orifice passage 35 shown in FIG. 8 in the power-roller inner race rather than the axially-elongated small-diameter through opening (for example, axial through opening 33 shown in FIG. 7), is superior in easy drilling. Additionally, stepped fluid-flow constriction orifice passage 35 is advantageous with respect to adjustment or control of the balance between the quantity of lubricating oil delivered to the tapered roller bearing and the quantity of lubricating oil delivered to the rolling contact surfaces between the power roller and input and output disks.

More preferably, inner race 30 of the toroidal CVT of the first embodiment is made of a bearing steel material such as SUJ2 (Japanese Industrial Standard symbol). Heat treatment for inner race 30 is achieved by way of hardening and tempering. As discussed above, in case of the non-radial-bearing equipped power roller structure of the toroidal CVT of the first embodiment, a power-roller inner-race inner peripheral portion, located inside of the inner raceway surface 32a and facing toward the common rotation axis of the input and output disks, can be formed as a solid cross section structure. By virtue of a comparatively high radial rigidity of the tapered-roller-bearing inner race structure of the power roller of the first embodiment, only a very slight elliptical deformation of inner race 30 occurs due to application of two radial components (Fr, Fr) of contact pressures (Fc, Fc) having the same magnitude and the same line of action but different sense. Hitherto, the power-roller inner race of the conventional toroidal CVT was a hollow-cross-section power-roller inner race structure, and thus there was an increased tendency for the inner race to greatly elliptically deform during application of two radial components (Fr, Fr). Such a great deformation of the inner race means increased bending stresses produced in the inner race. For the reasons discussed above, the power-roller inner race of the conventional toroidal CVT was often made of a carburized steel material, that is, a surface-hardened steel material, and heat treatment was achieved by way of hardening by carburizing treatment. In case of such a carburized steel material, that is, a surface-hardened steel material, its internal part of the surface-hardened power-roller inner race of the conventional CVT has a high toughness that prevents the inner race from cracking during operation of the toroidal CVT. Generally, the aforesaid hardening by carburizing treatment requires a longer heat treatment time length, thus increasing manufacturing costs of toroidal CVTs.

In contrast to the above, according to the non-radial-bearing equipped power roller structure of the toroidal CVT of the first embodiment, inner race 30 is formed as a substantially solid cross section structure having a high radial rigidity, and a bending stress, which is produced in inner race 30 due to application of two radial components (Fr, Fr), is negligibly small. There is no risk of the inner race's cracking due to the bending stress produced in inner race 30. Therefore, instead of using surface-hardening for example hardening by carburizing treatment, it is possible to simply harden the inner part as well as the surface layer of inner race 30 by way of hardening and tempering, such that the power-roller inner race of the toroidal CVT of the first embodiment is formed of a completely hardened steel. As set forth above, in case that inner race 30 of the toroidal CVT of the first embodiment is made of a bearing steel material such as SUJ2 (Japanese Industrial Standard symbol), and heat treatment for inner race 30 is achieved byway of hardening and tempering, it is possible to reduce heat-treatment costs. In the second (see FIG. 6), third (see FIG. 7), and fourth (see FIG. 8) embodiments, the inside diameter of axial oil passage 33 and the inside diameter of stepped fluid-flow constriction orifice passage 35 are small, and therefore an elliptical deformation of inner race 30 is very little, in other words, the magnitude of a bending stress produced in inner race 30 due to application of two radial components (Fr, Fr) of contact pressures (Fc, Fc) during operation of the toroidal CVT is negligible. Thus, in the same manner as the power roller structure of the first embodiment shown in FIG. 3, in the second, third, and fourth embodiments, instead of using surface-hardening such as hardening by carburizing treatment, it is possible to simply harden the inner part as well as the surface layer of inner race 30 by way of hardening and tempering, such that the power-roller inner race of the toroidal CVT of each of the second, third, and fourth embodiments is made of a completely hardened steel material. For the purpose of surface-hardening for steel materials, hardening and tempering treatment can be often achieved by introducing carbon and nitrogen in a gaseous atmosphere containing carbon and nitrogen, for example carbon monoxide or hydrocarbon and ammonia. If the inner part as well as the surface layer of a bearing steel is perfectly hardened byway of the hardening and tempering treatment in a gaseous atmosphere containing carbon and nitrogen, such a bearing steel heat-treated and completely hardened by way of such a hardening and tempering treatment in a gaseous atmosphere containing carbon and nitrogen can be included in a completely hardened steel.

The entire contents of Japanese Patent Application No. P2001-368415 (filed Dec. 3, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A toroidal continuously variable transmission comprising:
    input and output disks coaxially arranged with each other and having respective toroidal grooves opposed to each other;
    a plurality of power rollers interposed between the toroidal grooves of the input and output disks under axial preload for power transmission;
    a plurality of trunnions rotatably supporting the respective power rollers to permit tilting motions of the power rollers about trunnion axes for ratio changing;
    each of the power rollers comprising:
        (a) an inner race that transmits power input to the input disk into the output disk via a traction oil film formed between each of the power rollers and each of the input and output disks, using a shearing force in the traction oil film;
        (b) an outer race that is supported by the trunnion associated therewith; and
        (c) a power roller bearing that rotatably supports the inner race to permit relative rotation of the inner race to the outer race;
    the power roller bearing comprising a tapered roller bearing, the tapered roller bearing including:
        (a) an inner raceway surface formed on the inner race;
        (b) an outer raceway surface formed on the outer race;
        (c) a plurality of rolling elements, each sandwiched between the inner and outer raceway surfaces and having a frusto-conical shape in axial cross section; and
        (d) a collared portion that guides the rolling elements;
    the tapered roller bearing receiving both a radial load and a thrust load acting on the inner race;
    all of the inner raceway surface located to be offset from a line of action, common to a radial component of a contact pressure acting on a contact point between the inner race and the input disk and a radial component of a contact pressure acting on a contact point between the inner race and the ouput disk, toward the outer race; and
    a contact angle of the inner raceway surface dimensioned to be within a predetermined contact angle range of 50° to 75°.

2. The toroidal continuously variable transmission as claimed in claim 1, which further comprises:
    at least one oil passage formed in the inner race as a through hole near a rotation axis of the inner race.

3. The toroidal continuously variable transmission as claimed in claim 2, wherein:
    an axis of the oil passage is offset from the rotation axis of the inner race in a direction normal to the rotation axis of the inner race.

4. The toroidal continuously variable transmission as claimed in claim 3, wherein:
    the oil passage comprises a stepped oil passage including an inlet oil passage portion and an outlet oil passage portion having a relatively smaller inside diameter than the inlet oil passage portion.

5. The toroidal continuously variable transmission as claimed in claim 4, wherein:
    the inlet oil passage portion and the outlet oil passage portion are coaxially arranged with each other.

6. The toroidal continuously variable transmission as claimed in claim 1, wherein:
    a material of the inner race comprises a completely hardened steel.

7. A dual cavity type toroidal continuously variable transmission with a torque transmission shaft and a pair of variator units set in tandem and coaxially arranged in reverse to each other on the torque transmission shaft, each variator unit comprising:
    input and output disks coaxially arranged with each other and having respective toroidal grooves opposed to each other;
    a pair of power rollers interposed between the toroidal grooves of the input and output disks under axial preload for power transmission;
    a pair of trunnions rotatably supporting the respective power rollers to permit tilting motions of the power rollers about trunnion axes for ratio changing;
    each of the power rollers comprising:
        (a) an inner race that transmits power input to the input disk into the output disk via a traction oil film formed between each of the power rollers and each of the input and output disks, using a shearing force in the traction oil film;
        (b) an outer race that is supported by the trunnion associated therewith; and
        (c) a power roller bearing that rotatably supports the inner race to permit relative rotation of the inner race to the outer race;
    the power roller bearing comprising a tapered roller bearing, the tapered roller bearing including:
        (a) an inner raceway surface formed on the inner race;
        (b) an outer raceway surface formed on the outer race;
        (c) a plurality of rolling elements, each sandwiched between the inner and outer raceway surfaces and having a frusto-conical shape in axial cross section; and
        (d) a collared portion that guides the rolling elements;
    the tapered roller bearing receiving both a radial load and a thrust load acting on the inner race;
    all of the inner raceway surface located to be offset from a line of action, common to a radial component of a contact pressure acting on a contact point between the inner race and the input disk and a radial component of a contact pressure acting on a contact point between the inner race and the output disk, toward the outer race; and
    a contact angle of the inner raceway surface dimensioned to be within a predetermined contact angle range of 50° to 75°.

8. The dual cavity type toroidal continuously variable transmission as claimed in claim 7, which further comprises:

at least one oil passage formed in the inner race as a through hole near a rotation axis of the inner race.

9. The dual cavity type toroidal continuously variable transmission as claimed in claim 8, wherein:

an axis of the oil passage is offset from the rotation axis of the inner race in a direction normal to the rotation axis of the inner race.

10. The dual cavity type toroidal continuously variable transmission as claimed in claim 9, wherein:

the oil passage comprises a stepped oil passage including an inlet oil passage portion and an outlet oil passage portion having a relatively smaller inside diameter than the inlet oil passage portion.

11. The dual cavity type toroidal continuously variable transmission as claimed in 10, wherein:

the inlet oil passage portion and the outlet oil passage portion are coaxially arranged with each other.

12. The dual cavity type toroidal continuously variable transmission as claimed in claim 7, wherein:

a material of the inner race comprises a completely hardened steel.

* * * * *